United States Patent
MacDonald et al.

(10) Patent No.: US 6,462,858 B1
(45) Date of Patent: Oct. 8, 2002

(54) FAST ATTENUATOR

(75) Inventors: Robert I. MacDonald, Manotick; Lianxiang Yang, Ottawa; Phillipe Lonjoux, Kanata; Paul Colbourne, Nepean; Mohiuddin Mala, Ottawa, all of (CA)

(73) Assignee: JDS Uniphase Inc., Ottawa (CA)

( * ) Notice: Subject to any disclaimer, the term of this patent is extended or adjusted under 35 U.S.C. 154(b) by 0 days.

(21) Appl. No.: 09/783,529

(22) Filed: Feb. 15, 2001

(51) Int. Cl.[7] .............................................. G02B 26/00
(52) U.S. Cl. ...................... 359/290; 359/291; 359/295; 359/237; 359/847
(58) Field of Search ................................ 359/290, 291, 359/292, 295, 231, 224, 230, 847, 846, 237; 347/135, 255

(56) References Cited

U.S. PATENT DOCUMENTS

| | | | |
|---|---|---|---|
| 4,441,791 A | | 4/1984 | Hornbeck .................... 350/360 |
| 4,930,352 A | | 6/1990 | Parker, Jr. et al. ............. 73/662 |
| 5,022,745 A | | 6/1991 | Zayhowski et al. .......... 350/608 |
| 5,223,971 A | * | 6/1993 | Magel ......................... 359/295 |
| 5,287,215 A | | 2/1994 | Warde et al. ................. 359/293 |
| 5,357,807 A | | 10/1994 | Guckel et al. ................. 73/721 |
| 5,508,840 A | * | 4/1996 | Vogel et al. ................. 359/291 |
| 5,654,819 A | * | 8/1997 | Goosen et al. ............... 359/291 |
| 5,719,846 A | | 2/1998 | Matoba et al. ............... 369/112 |
| 5,774,252 A | | 6/1998 | Lin et al. ..................... 359/224 |
| 5,900,983 A | * | 5/1999 | Ford et al. .................... 359/627 |
| 5,915,063 A | | 6/1999 | Colbourne et al. .......... 385/140 |
| 5,943,158 A | | 8/1999 | Ford et al. .................... 359/295 |
| 6,002,513 A | * | 12/1999 | Goossen et al. ............. 359/291 |
| 6,002,661 A | | 12/1999 | Abe et al. ..................... 369/112 |
| 6,108,121 A | | 8/2000 | Mansell et al. .............. 359/291 |
| 6,137,941 A | | 10/2000 | Robinson ..................... 385/140 |
| 6,147,789 A | * | 11/2000 | Gelbart ........................ 359/231 |
| 6,154,586 A | * | 11/2000 | McDonald et al. ........... 385/18 |

* cited by examiner

Primary Examiner—Hung Xuan Dang
Assistant Examiner—Tuyen Tra
(74) Attorney, Agent, or Firm—Neil Teitelbaum

(57) ABSTRACT

The invention provides a fast variable optical attenuator including a reflective membrane that serves as a varifocal mirror. Electrostatic deflection of the mirror defocuses the optical system and attenuates an optical signal launched to the mirror from an input port to an output port. Since the mirror is generally limited to deflections less than 1 micron, fast attenuation within a small (<5 dB) dynamic range is achieved. The dynamic range is improved by combining the fast attenuator with a slower attenuator. In the preferred embodiment, the slow and fast attenuator are not coupled via optical waveguides, but rather are optically coupled via free space or are integrated in the same device. Advantageously, this compact arrangement reduces the excess loss associated with optical fiber coupling and lowers packaging costs.

15 Claims, 7 Drawing Sheets

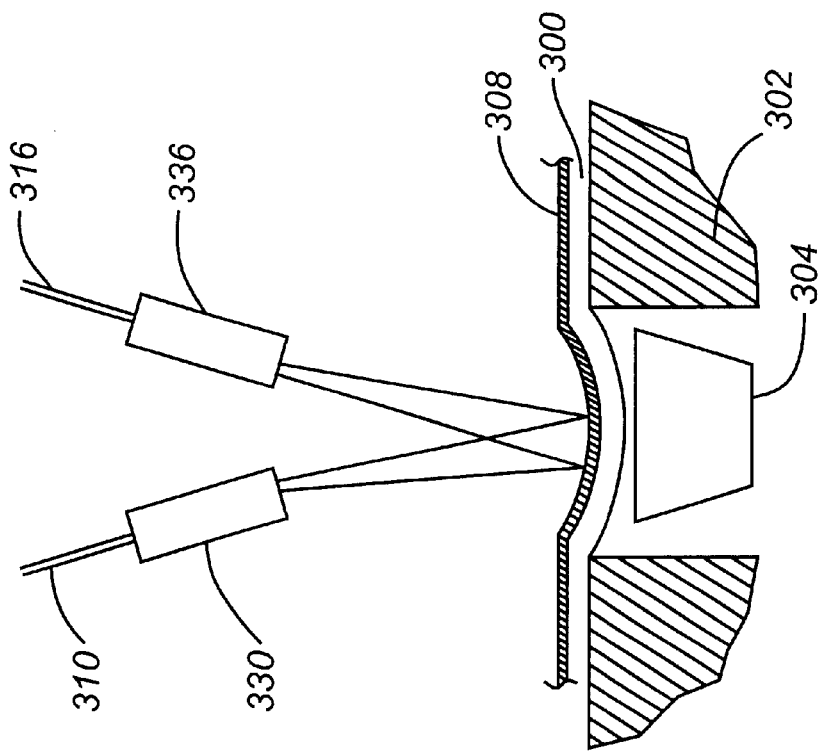
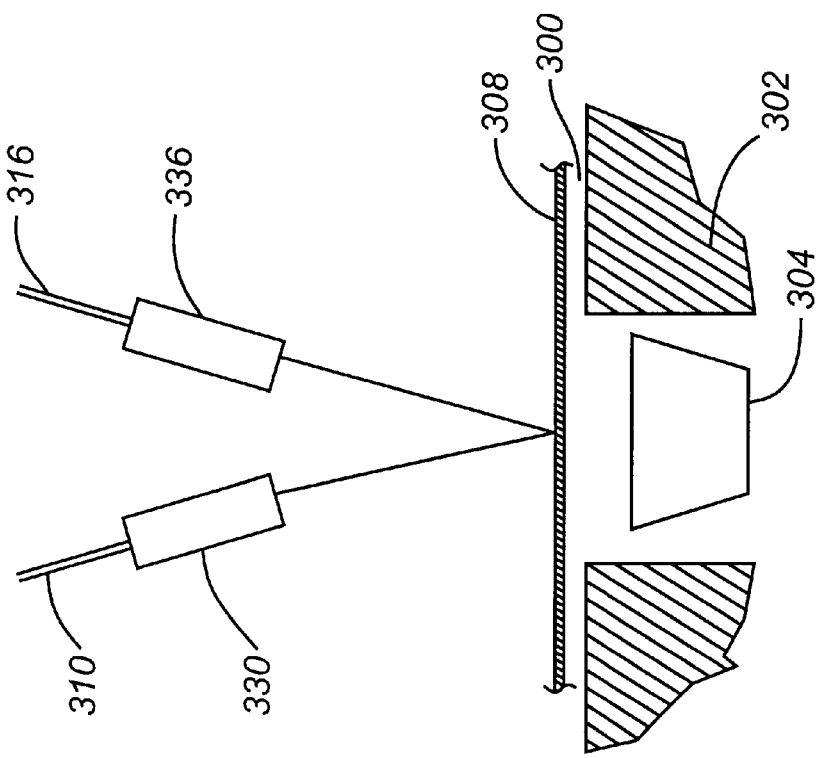
FIG. 6a
FIG. 6b
FIG. 6

FOR CIRCULAR MIRROR

FOR SQUARE MIRROR

FAST ATTENUATOR

FIELD OF THE INVENTION

This invention relates generally to the field of optical attenuators and more specifically to a fast optical attenuator.

BACKGROUND OF THE INVENTION

Optical attenuators are used to adjust the optical power level in optical signals, for example to equalize levels among WDM channels or to prevent saturation of receivers. Such applications generally require the attenuator to be adjustable over more than 20 dB. Low cost examples of this type of optical attenuator include neutral density filters, attenuating prisms, beam blockers, tilting mirrors and/or systems to bend or off-set optical fibers. Typically, the relatively large mass of the movable attenuating optics in these devices limit the response time to milliseconds.

Optical attenuators may also be used to impose information upon the optical signal passing through them, for example telemetry information. However, such applications typically require a response time of microseconds with a dynamic range of about 5 dB. Conventionally, optical attenuators that are capable of achieving fast speed in the order of MHz are based on electro-optics, acousto-optics, or magneto-optics. Traditionally, these fast attenuators are wavelength sensitive, have a relatively high insertion loss, and a relatively high cost.

Ideally, an optical attenuator should have a fast response time and be able to adjust the optical power level over a wide range of intensity levels. Unfortunately, the design of a low cost attenuator that has simultaneously high speed and wide dynamic range is very difficult.

It is an object of this invention to provide to provide a fast optical attenuator that is relatively low cost.

It is another object of this invention to provide an optical attenuator having a wide dynamic range and that can also provide attenuation that varies at high speeds.

SUMMARY OF THE INVENTION

The instant invention provides a variable optical attenuator that attenuates over a wide dynamic range and that operates at high speeds. The optical attenuator includes a slow attenuator having a large dynamic range and a fast attenuator having a smaller dynamic range. In the preferred embodiment, the slow and fast attenuator are not coupled via optical waveguides, but rather are optically coupled via free space or are integrated in the same device. Advantageously, this compact arrangement reduces the excess loss associated with optical fiber coupling and lowers packaging costs. Moreover, each of the slow and fast attenuators work together to modulate an optical signal from the other such that the total attenuation of the device is the product of the two separate attenuations.

In a preferred embodiment, the fast attenuation is provided by a varifocal mirror. Electrostatic deflection of the mirror defocuses the optical system and attenuates an optical signal launched to the mirror from an input port to an output port. Since the mirror is generally limited to deflections less than 1 micron, fast attenuation within a small (<5 dB) dynamic range is achieved.

In accordance with the invention there is provided an optical attenuator comprising an input port and an output port, a deformable membrane having a reflective surface disposed to reflect light launched from the input port substantially towards the output port, the membrane supported by a frame having an opening, and deforming means for controllably deflecting the membrane into the opening such that the reflective surface forms a concave mirror having a concavity that determines the optical coupling efficiency between the input and output ports, the membrane deformable between a first position in which light launched from the input port is received at the output port with substantially no attenuation, and a plurality of other positions in which light launched from the input port is inefficiently coupled into the output port.

In accordance with the invention there is provided an optical attenuator comprising a first port and a second port, a deformable membrane having a reflective surface disposed to reflect light launched from the first port substantially towards the second port, the membrane supported by a frame having a radially symmetric opening, and deforming means for controllably deflecting the membrane into the opening such that the reflective surface forms a concave mirror having a concavity that determines the optical coupling efficiency between the first and second ports.

In accordance with the invention there is provided an optical attenuator comprising: an input port and an output port; a deformable membrane having a reflective surface disposed to reflect light launched from the input port substantially towards the output port, the membrane supported by a frame having an opening; deforming means for controllably deflecting the membrane into the opening such that the reflective surface forms a concave mirror having a concavity that determines a first order optical coupling efficiency between the first and second ports; and a movable member for controllably moving the frame and membrane between a plurality of positions that determine a second order optical coupling efficiency between the first and second ports.

In accordance with the invention there is provided a variable optical attenuator comprising: a first attenuator having a dynamic range less than about 10 dB and a response time of less than about one microsecond; and a second attenuator having a dynamic range greater than about 10 dB at a response time greater than about one millisecond, wherein the first and second attenuators are optically coupled in series.

BRIEF DESCRIPTION OF THE DRAWINGS

Exemplary embodiments of the invention will now be described in conjunction with the drawings in which:

FIG. 6a is a schematic diagram of another embodiment of a fast attenuator in accordance with the instant invention;

FIG. 6b is a schematic diagram the embodiment shown in FIG. 6a where the membrane is deformed into a concave reflector;

DETAILED DESCRIPTION OF THE INVENTION

As described above, optical attenuators that have a relatively fast (e.g., less than a microsecond) response time are frequently based on electro-optics, acousto-optics, or magneto-optics.

Figure 1:
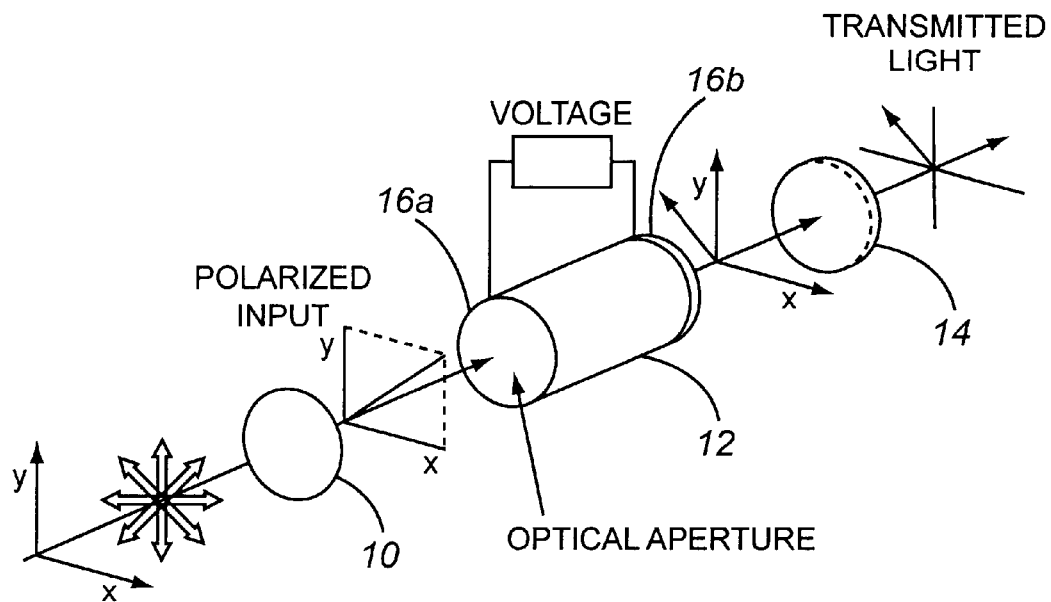
FIG. 1 is a schematic diagram of a prior art optical attenuator based on the electro-optic effect.

Referring to FIG. 1, there is shown an example of a prior art fast attenuator based on the electro-optic effect, e.g., Pockels or Kerr effects. A non-polarized beam of light is launched through a first polarizer 10, the electro-optic material 12 (e.g., lithium niobate), and a second polarizer (analyzer) 14. When no voltage is applied to the electro-optic material 12, there is substantially no loss in intensity observed. When a voltage is applied to the material 12 via ring electrodes 16a and 16b, the direction of the polarized light leaving the first polarizer 10 is rotated by an angle related to the applied voltage, thus affecting the amount of light transmitted through the analyzer 14. The disadvantages of this type of optical attenuator include relatively high voltage requirements, limited beam diameter capabilities that lead to high insertion loss, material unreliability, and sensitivity to wavelength.

Figure 2:
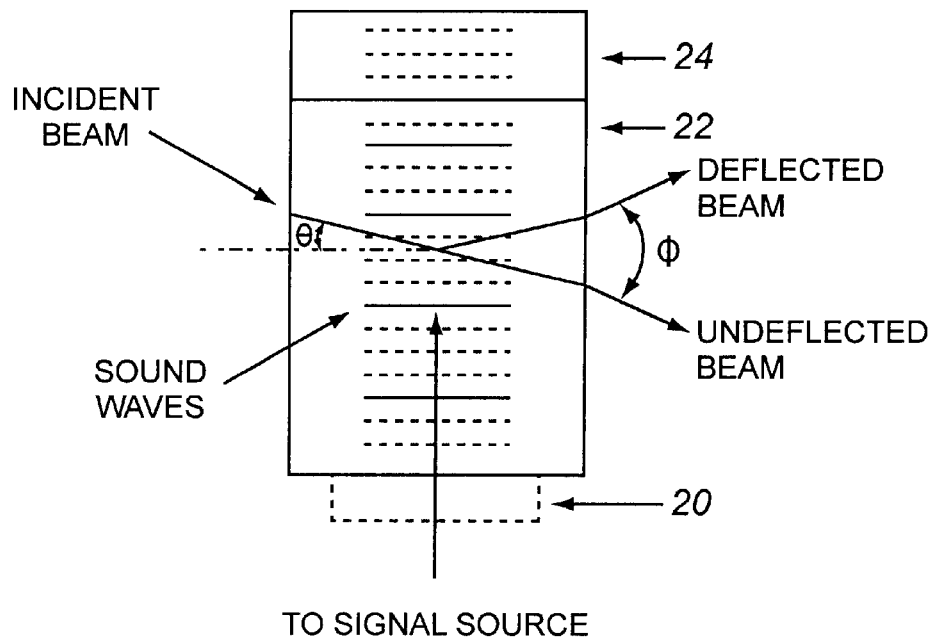
FIG. 2 is a schematic diagram of a prior art optical attenuator based on the acoustic-optic effect.

Referring to FIG. 2, there is shown an example of a prior art fast attenuator based on acousto-optics. The attenuator includes a piezoelectric transducer 20, an acousto-optic material 22, and an acoustic absorber 24. The transducer 20 provides a sound wave that travels through the acousto-optic material 22, e.g. as a series of compressions and rarefractions. In regions where the sound pressure is high, the acousto-optic material 22 is compressed slightly, thus locally increasing the index of refraction. This series of local increases in index of refraction forms a grating that defracts an incident beam of light as it travels through the acousto-optic material 22. The angle of deflection is related to the radio-frequency power applied to the transducer. When no acoustic wave is provided, no light is deflected. The disadvantages of this optical attenuator include wavelength sensitivity and an excessively high cost.

Figure 3:
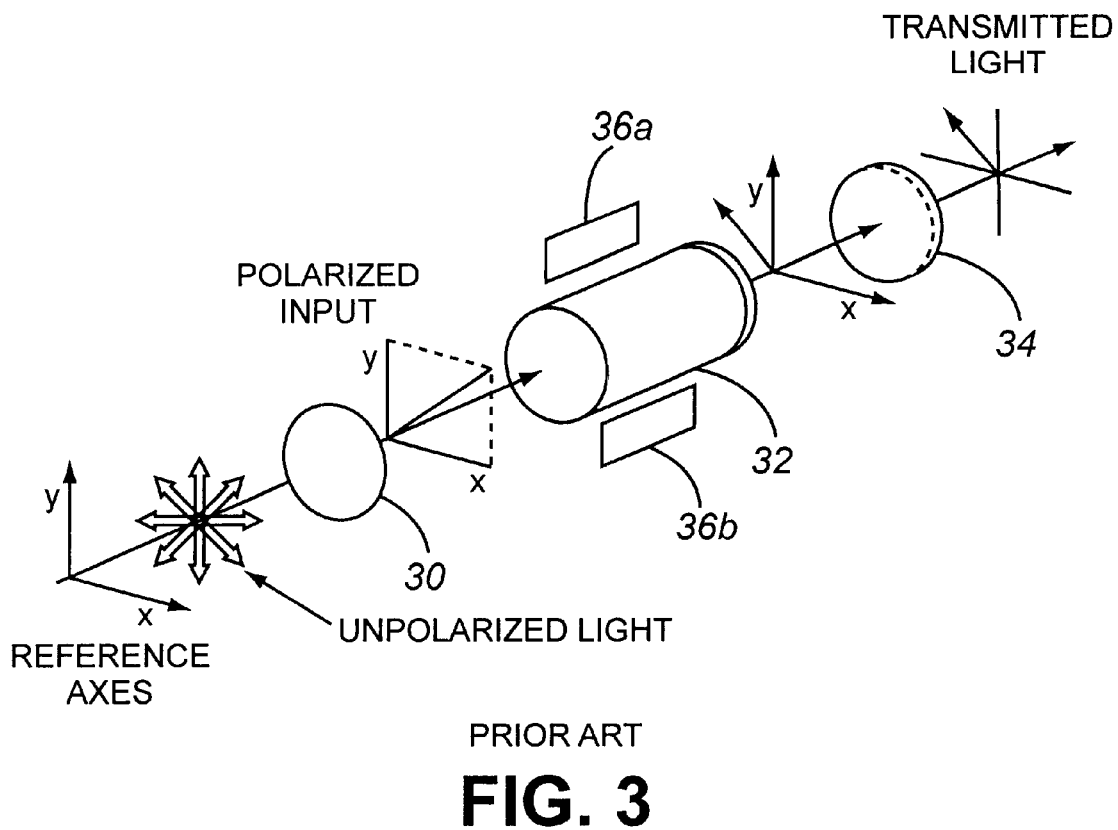
FIG. 3 is a schematic diagram of a prior art optical attenuator based on the magneto-optic effect.

Referring to FIG. 3, there is shown an example of a prior art fast attenuator based on magneto-optics. A non-polarized beam of light is launched through a first polarizer 30, a magneto-optic material 32, and a second polarizer (analyzer) 34. When no magnetic field is applied, there is substantially no loss observed. When a magnetic field is applied to the material 32 via magnets 36a and 36b, the direction of the polarized light leaving the first polarizer 10 is rotated by an angle related to the applied voltage, thus affecting the amount of light transmitted through the analyzer 34. The disadvantages of this type of optical attenuator include high insertion loss and wavelength sensitivity.

The prior art fast attenuators described heretofore are based on systems with non-moving parts. Presumably, this is due to the fact that the speed of moving an attenuating optic is limited by the inertia of the object moved. Accordingly, fast attenuators have traditionally been limited to relatively costly systems with non-moving parts.

One solution to this is to provide an attenuating object with a relatively small inertia. For example, it is well known that ultrasonic transducers fabricated by MEMS technologies can be driven electrostatically at speeds in the 10 MHz region. Moreover, these transducers are simple and thus show remarkable potential for reliablity.

Figure 4:
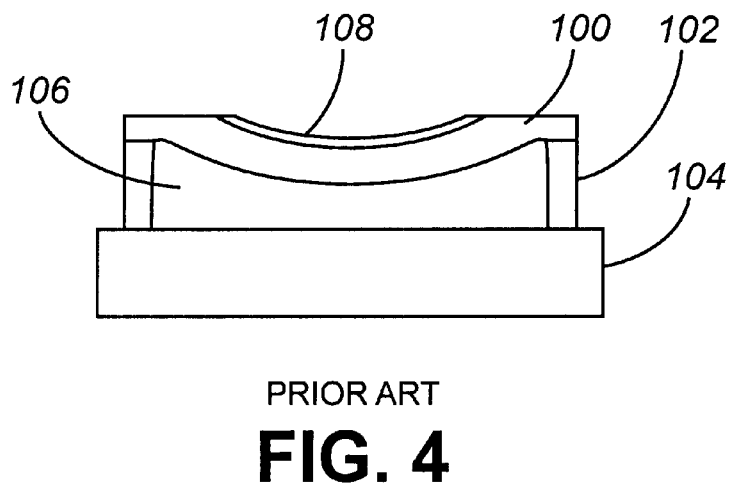
FIG. 4 is a schematic diagram of a prior art acoustic transducer.

Referring to FIG. 4, there is shown a MEMS ultrasonic transducer including a thin membrane 100, typically made of silicon nitride (SiN), stretched over the periphery of a frame 102, which is also typically made of SiN. The structure is formed by MEMS technology on a silicon substrate 104, thus forming a cavity 106 in the order of 5–50 microns deep between the substrate 104 and the membrane 100. An electrically conductive material 108, such as aluminum, is coated on the membrane 100. The silicon substrate 104 and conductive material 108, each serve as an electrode of a capacitor for providing a measure of membrane deflection resulting from pressure changes near the membrane 100. For maximum efficiency the ultrasonic transducers are usually operated at a mechanical resonance. Typically the structures are tensioned by applying a DC voltage of 10–100 volts, such that the mechanical resonance frequencies are very high, e.g., in the 10 MHz range. Preferably, the SiN layer 100 is uniform and the tensioned membrane has a radially symmetric concave shape. Advantageously, MEMS ultrasonic transducer technology produces the cavity 106 without perforating the membrane. The uniform membranes are deflectable into an approximately parabolic shape by an applied DC voltage.

When the uniform MEMS membrane disclosed above includes a reflective surface, the deformable membrane becomes a deformable mirror having a shape dependent on the degree of deflection, the number of electrodes, and the placement of the electrodes. More specifically, the deformable mirror can be constructed to form a concave mirror having a variable focal point. This type, or similar, deformable mirrors have been proposed for various spatial light modulators (e.g., U.S. Pat. Nos. 4,441,791 and 6,147,789, herein incorporated by reference). However, in general, the design of these prior art deformable mirrors is not compatible with the wavelength insensitive, polarization sensitive requirements for optical attenuators used in telecommunication systems. Moreover, these prior art devices are generally limited to on/off states and do not recognize the advantageous of providing variable attenuation.

Figure 5:
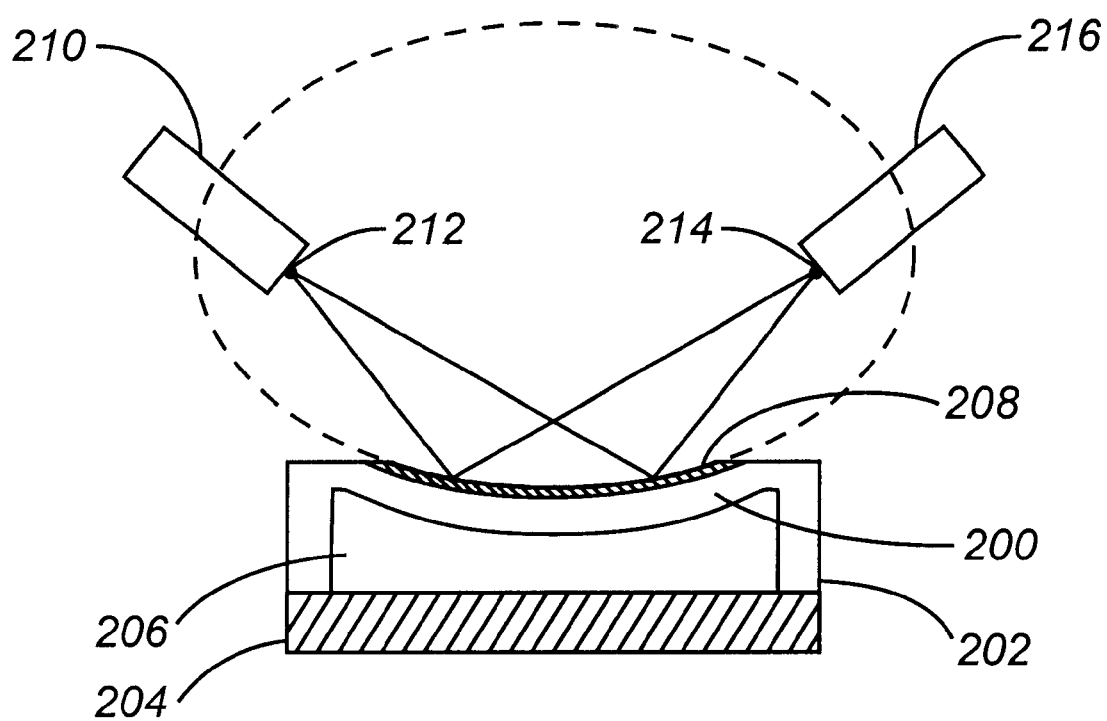
FIG. 5 is a schematic diagram of an embodiment of a fast attenuator in accordance with the instant invention including a MEMS membrane having a reflective surface.

Referring to FIG. 5, there is shown an embodiment of a variable optical attenuator in accordance with the instant invention having a structure similar to the acoustic transducer shown in FIG. 4. The attenuator includes a thin membrane 200, preferably made of silicon nitride (SiN), stretched over the periphery of a frame 202, which is also preferably made of SiN. For example, the structure can be formed by MEMS technology on a silicon substrate 204 to form a cavity 206 about 1–10 microns deep between the substrate 204 and the membrane 200. An electrically conductive and reflective material 208, such as gold, is coated on the membrane 200. Preferably, the surface has a reflectivity greater than about 99%. The silicon substrate 204 and conductive material 208, each serve as an electrode of a capacitor that provides deforming means for deforming the membrane 200. When a potential is applied between the two electrodes, electrostatic forces cause the membrane to be attracted to the substrate such that the reflective surface 208 becomes a focussing mirror. Referring to FIG. 5, the deformable membrane becomes an approximately elliptical mirror designed to reflect a beam of light launched from one of its two foci, e.g., 212, onto the other focus, e.g., 214. Accordingly, an input optical fiber 210 is positioned at a first focus 212 of the elliptical mirror, whereas an output optical fiber 216 is positioned at the other focus 214. The arrangement shown in FIG. 5, corresponds to a maximum optical coupling arrangement or the low loss state. When the potential applied to the two electrodes is varied, the membrane is deflected to various positions, thus changing the position of the foci and providing variable attenuation for a beam of light launched from the input port 210 and collected at the output port 216. In other words, when the shape of the mirror 208 changes, the efficiency of the coupling changes, thus providing a controllable variable attenuation. Optionally, the shape of the mirror is further controlled by using multiple electrodes.

Preferably, the thickness of the membrane including the reflective layer, the diameter of the deformable portion, and the applied voltage and are selected such that the maximum deflection is less than about 1 $\mu$m to achieve a maximum attenuation of about 3–10 dB, or more preferably of about 3–5 dB. Although this relatively small deflection generally limits the dynamic range of the fast attenuator, many applications of fast attenuators only require small dynamic range. For example, when the fast attenuator is used to provide a small amplitude modulation on an optical pulse stream, only small amplitude modulation is desired.

The diameter of the deformable membrane is also related to the response time. Preferably, the diameter of the membrane is designed to be about 100 to 300 $\mu$m. Membrane diameters varying from about 150 $\mu$m to 300 $\mu$m have been calculated to be particularly useful. Although it is preferred that the mirror be substantially spherical when deformed, the membrane can also take on other shapes, such as a square.

Advantageously, the circular membrane is radially symmetric to provide the wavelength insensitive and polarization insensitive requirements for optical attenuators used in telecommunication systems.

Problems arising from the diameter of the beam being larger than the diameter of the membrane, may be circumvented by using a lens designed to reduce the beam diameter (e.g., a SELFOC having more than one-quarter pitch). Alternatively the membrane diameter is designed to be larger than 300 $\mu$m, e.g., about 500 $\mu$m, but wherein only an area having a diameter of about 300 $\mu$m is deformable. Alternatively, a plurality of deformable membranes is disposed in close proximity to one another to receive a single beam of light.

Referring to FIG. 6, there is shown another embodiment of a fast attenuator in accordance with the instant invention including lenses 330 and 336 optically coupled to the input 310 and output 316 fibers. FIG. 6a illustrates the low loss state, wherein the reflective surface 308 is not deformed, i.e., is substantially flat, and wherein light launched from the input fiber 310 is substantially coupled into the output fiber 316. In FIG. 6b, the reflective surface is electrostatically deformed to form a concave reflective surface. As a result, the beam of light launched from the input fiber 310 is not effectively coupled into the output fiber 316, thus providing attenuation of the optical signal. Variable attenuation is provided by varying the applied potential (e.g., typically by applying a voltage from about 10–100 V). In one embodiment, the focussing mirror is designed to provide the extra optical power required for efficient coupling, and the lenses are somewhat shorter or longer than those required for efficient coupling with reflection off a flat mirror. Alternatively, the optical fibers are thermally expanded core fibers, and/or include other means for increasing the optical coupling efficiency.

The fast optical attenuators depicted in FIGS. 5 and 6 have been calculated to provide insertion losses varying from about 0.02 dB to 0.6 dB, maximum attenuation less than about 10 dB, and microsecond response times. More specifically, it has been calculated that a deflection of 0.5 $\mu$m can correspond to an attenuation to about 2 dB.

Advantageously, the varifocal optical attenuators described above provide modulation with a rate in the 1 MHz range, and small dynamic range (up to 30%), for imposing dither, telemetry and other in-band modulation on optical data.

In accordance with another aspect of the instant invention, there is provided an optical attenuator including the MEMS attenuator described above and a slow, high dynamic range (>20 dB) attenuator for providing both fast modulation with the slow, precise and high range attenuation properties characteristic of the conventional slow attenuators.

Figure 7:
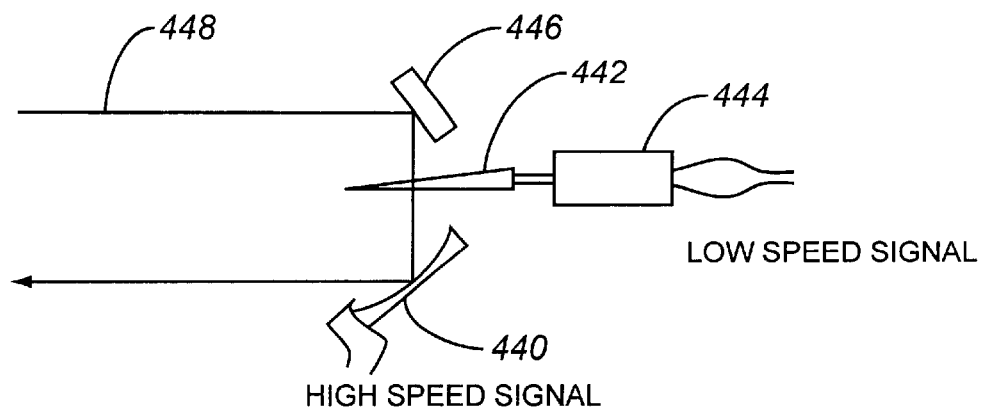
FIG. 7 is a schematic diagram of an embodiment of a fast attenuator having a wide dynamic range.

Referring to FIG. 7, there is shown an embodiment of an optical attenuator including a MEMS varifocal mirror 440 for providing fast attenuation with a dynamic range less than about 5 dB within about one microsecond, and a graded neutral density filter 442 for providing slow attenuation with a dynamic range greater than about 20 dB within about a millisecond. A mirror 446 directs a beam of light launched along an optical path 448 to the neutral density filter 442, which is controllably moved in and out of the optical path 448 with a stepping motor 444 to provide the slow attenuation. The varifocal mirror 440 is disposed in the optical path in series with the neutral density filter 442 to provide the fast modulation. The two attenuators are controlled independently.

Figure 8:
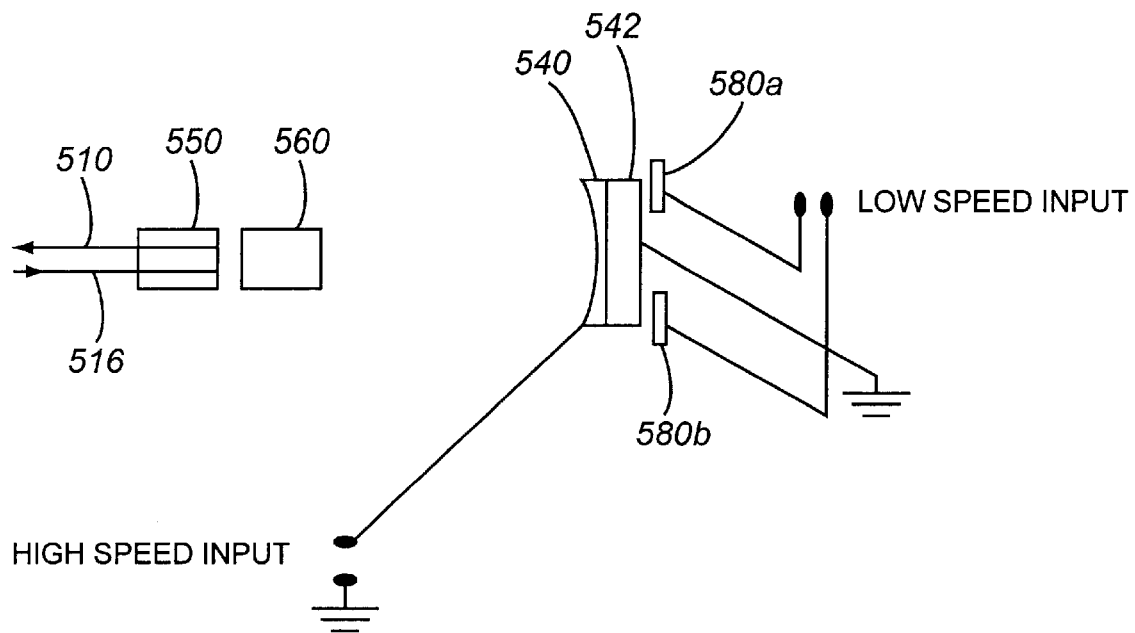
FIG. 8 is a schematic diagram of another embodiment of a fast attenuator having a wide dynamic range.

Referring to FIG. 8, there is shown another embodiment of an optical attenuator in accordance with the instant invention, wherein a varifocal mirror 540 for providing fast modulation is supported on a tilting substrate 542 for providing the slow attenuation. Separate input control is provided for each attenuator (i.e., the fast 540 and the slow 542). Preferably, the substrate 542 is tilted using a piezoelectric crystal, thermal deformation, or electronic charge as shown in FIG. 8. The optical attenuator further includes a single lens 560 disposed between the combination attenuator 540,542 and the input 510 and output 516 optical fibers, which are supported by a double bore tube 550.

In operation, a beam of light launched from input optical fiber 510 is transmitted through the lens 560 and is incident on the reflective surface of the varifocal mirror 540. The reflected light is retransmitted through the lens 560 and is directed to the output optical fiber 516 with a coupling efficiency related to the degree of deflection of the varifocal mirror 540 and an angle of the tilting substrate 542. Low speed attenuation input is provided via electrodes 580a and 580b, which electrostatically attract one side of the substrate 542 closer to the electrodes. High speed attenuation input is provided via the electrodes within the varifocal mirror as discussed above. Advantageously, this embodiment allows the fast and slow attenuation to be provided simultaneously and controlled independently.

Figure 9:
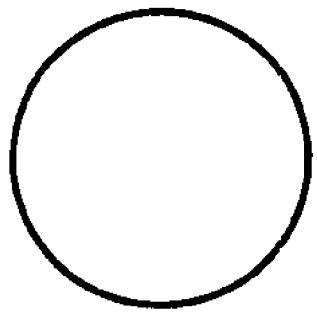
FIG. 9 is a schematic diagram showing the shape of a beam spot at the position of the receiving end after defocusing for both circular and square membranes.
Figure 9:

Notably, a square membrane is particularly attractive for the embodiment illustrated in FIG. 8. Referring to FIG. 9, the beam spot produced at the output port by the square membrane is elliptical in shape. Deformation of the square membrane expands the output spot along the major axis only. This means that if the tilting platform moves the spot along the minor axis, and the membrane expands the spot along the major axis, the fast and slow attenuation mechanisms will function independently, without interfering with the other's operation. Only small deflections of the substrate 542 in a direction that moves the beam spot in a direction parallel to the minor axis of the ellipse, are necessary to provide very sensitive slow attenuation. Notably, when the membrane is square only two opposing sides of the membrane need to be supported.

Figure 10:
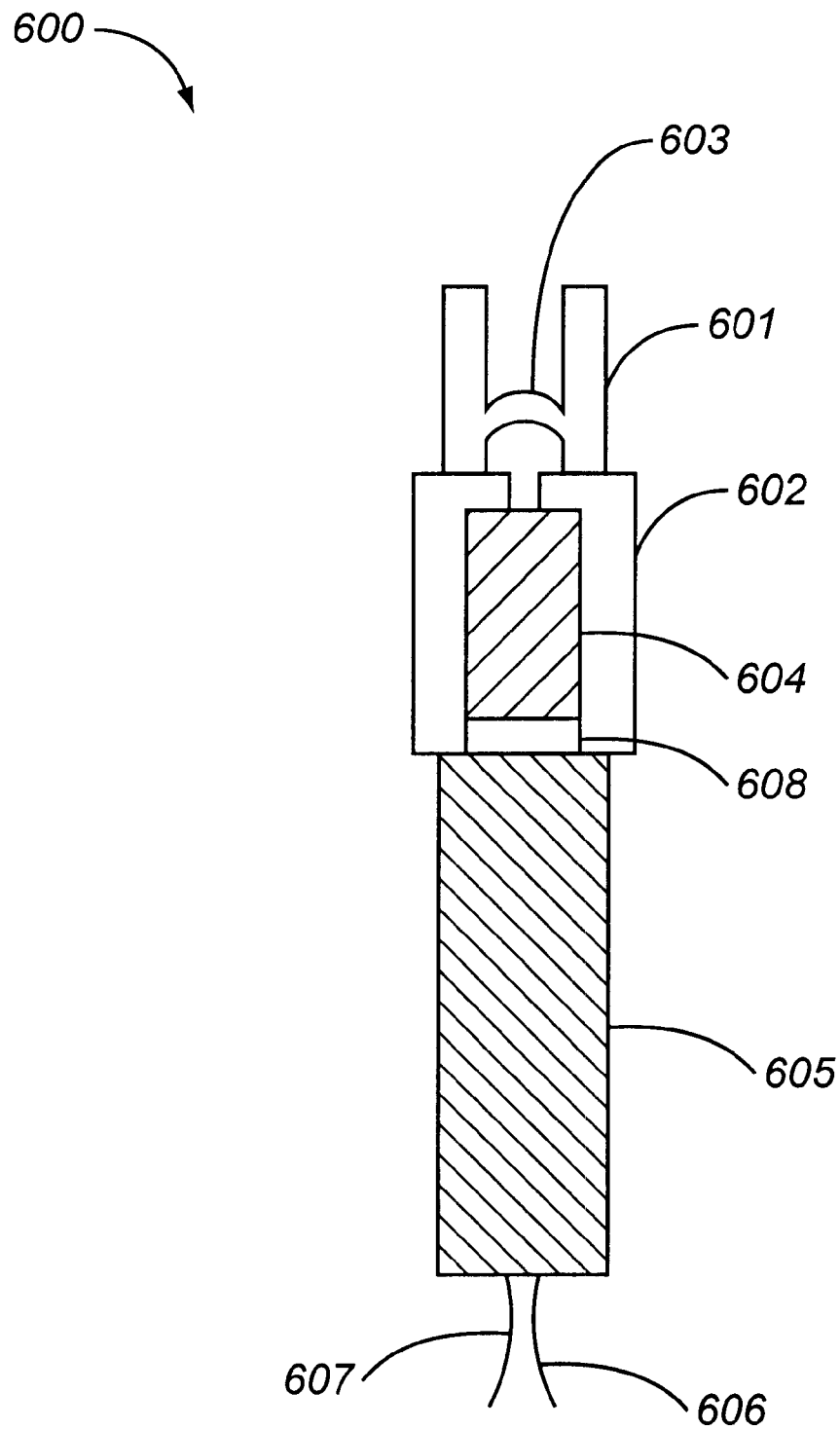
FIG. 10 is a schematic diagram showing another embodiment of a fast attenuator having an axial design.

Referring to FIG. 10, there is shown another embodiment of a fast attenuator having axial design. More specifically, the axial design includes a wafer bonded membrane chip 601 and top chip 602. The membrane chip 601 supports membrane 603. The top chip 602 includes a slot for supporting a lens 604, which is secured within the slot with an adhesive. A double bore tube 605 supporting input 606 and output 607 optical fibers is secured to the top chip 602 with an adhesive. A cavity 608, or air gap, separates the lens 604 and the double bore tube 605. This embodiment has the advantage of being relatively compact (e.g., less than 7 mm in length) and relatively stable.

Of course, numerous other embodiments can be envisaged without departing from the spirit and scope of the invention. For example, the fast and slow attenuators are not limited to those disclosed herein, other attenuators are also possible.

What is claimed is:

1. An optical attenuator comprising:
   an input port and an output port;
   a deformable membrane having a reflective surface disposed to reflect light launched from the input port substantially towards the output port, the membrane supported by a frame having a radially symmetric opening; and
   deforming means for controllably deflecting the membrane into the opening such that the reflective surface forms a concave mirror having a concavity that determines the optical coupling efficiency between the input and output ports.

2. An optical attenuator according to claim 1, wherein the deforming means comprises a capacitor for electrostatically deforming the membrane, a first electrode of the capacitor corresponding to the reflective surface and a second electrode corresponding to a substrate disposed below the membrane.

3. An optical attenuator according to claim 2, wherein the opening has a diameter from about 100 microns to about 300 microns.

4. An optical attenuator according to claim 3, wherein a deflection of the membrane is restricted to less than about 1 micron.

5. An optical attenuator according to claim 4, wherein the input and output ports are optically coupled to input and output optical fibers, respectively.

6. An optical attenuator according to claim 5, further comprising at least one lens optically coupled to the input and output optical fibers.

7. An optical attenuator according to claim 6, comprising a first chip including the frame and a second chip including a slot for support the at least one lens.

8. An optical attenuator according to claim 2, wherein in the first position the reflective surface corresponds to a focussing mirror, and wherein the input and output ports are disposed about first and second foci of the focussing mirror, respectively.

9. An optical attenuator according to claim 2, wherein in the first position the reflective surface corresponds to a substantially flat mirror.

10. An optical attenuator according to claim 2, wherein the membrane and deforming means are designed such that the optical attenuator has a dynamic range less than about 10 dB.

11. An optical attenuator according to claim 10, further comprising another attenuator designed to have a dynamic range greater than about 10 dB.

12. An optical attenuator according to claim 11, wherein the other attenuator comprises one of a neutral density filter, an attenuating prism, a beam blocker, and a tilting mirror, and is optically coupled to the reflective surface via free space optics.

13. An optical attenuator according to claim 10, further comprising a tiltable substrate for supporting the optical attenuator, the tiltable substrate designed to further affect optical coupling efficiency between the input and output ports such that variable attenuation greater than about 10 dB is provided.

14. A variable optical attenuator comprising:
    a first attenuator having a dynamic range less than about 10 dB and a response time of less than about one microsecond; and
    a second attenuator having a dynamic range greater than about 10 dB at a response time greater than about one millisecond,
    wherein the first and second attenuators are optically coupled in series.

15. A variable optical attenuator according to claim 14, wherein the first attenuator is a MEMS varifocal mirror and the second attenuator comprises one of a neutral density filter, an attenuating prism, a beam blocker, and a tilting mirror.

* * * * *